J. S. RAMSEY.
CLOSURE FOR MILK BOTTLES.
APPLICATION FILED SEPT. 17, 1913.

1,104,706.

Patented July 21, 1914.

Witnesses
Philip E. Barnes
J. W. Sherwood

Inventor
John S. Ramsey
By Franklin H. Hough
Attorney

UNITED STATES PATENT OFFICE.

JOHN S. RAMSEY, OF CONSHOHOCKEN, PENNSYLVANIA.

CLOSURE FOR MILK-BOTTLES.

1,104,706.  Specification of Letters Patent.  Patented July 21, 1914.

Application filed September 17, 1913. Serial No. 790,289.

*To all whom it may concern:*

Be it known that I, JOHN S. RAMSEY, a citizen of the United States, residing at Conshohocken, in the county of Montgomery and State of Pennsylvania, have invented certain new and useful Improvements in Closures for Milk-Bottles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in closures for milk bottles and the object in view is to produce a simple and efficient device of this nature which may be temporarily attached to a milk bottle, affording a suitable closure therefor.

My invention comprises various details of construction and combinations and arrangements of parts which will be hereinafter fully described and then specifically defined in the appended claims.

I illustrate my invention in the accompanying drawings, in which:—

Figure 1:
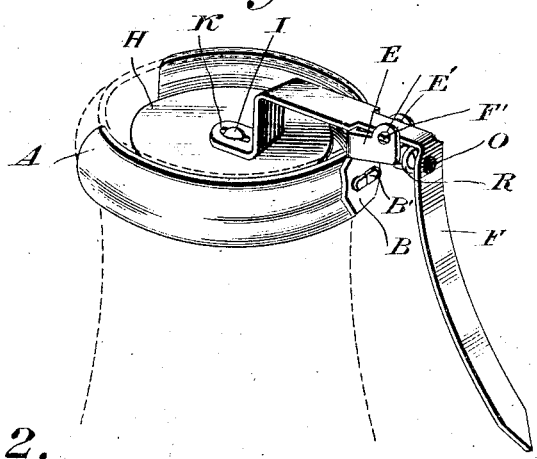
Figure 2:
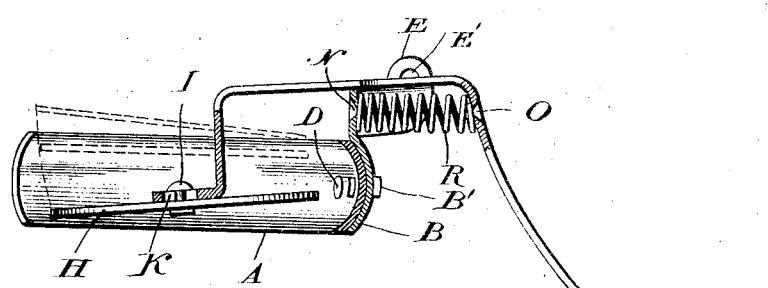
Figure 3:
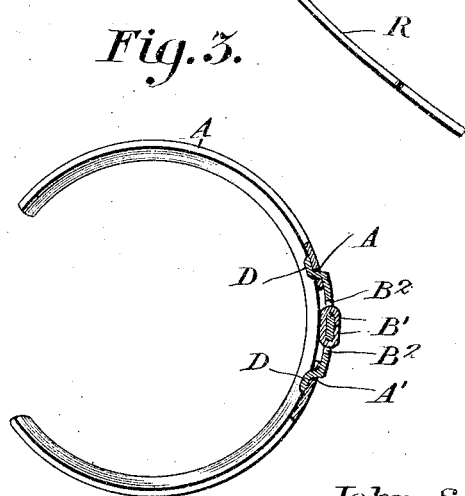

Figure 1 is a perspective view showing the application of my device to a milk bottle. Fig. 2 is a sectional view longitudinally and centrally through the handle and transversely through the disk, and Fig. 3 is a longitudinal sectional view through a portion of the split ring and plate secured thereto.

Reference now being had to the details of the drawings by letter, A designates a split ring made of resilient material and concaved and is adapted to spring over and engage the beading at the top of a milk bottle in the manner shown in the drawings. Said ring has a plate B fastened thereto, preferably by means of the lugs B' which are struck up from said ring and passed through the apertures B² formed in said plate and are clenched over the edges of the aperture, while other lugs, designated by letter D struck up from the plate, pass through the apertures A' formed in the ring and are clenched against the inner concaved surface of the latter. Said plate has vertically disposed wings E, E which are spaced apart and are provided with apertures E'. A handle F has pivotal lugs F' projecting from the opposite edges thereof and are adapted to have bearings in the apertures in said arms and a disk H, forming a closure for the bottle, has a headed pivotal pin I fastened centrally thereto and which pin extends through a slot K formed in the angled end of said handle. Said plate is provided with a struck up lug N and the handle is also provided with a similar lug O struck up therefrom and a coiled spring R engages over the lugs N and O and serves to normally hold the disk at its farthest downward limit or in engagement with the shoulder formed in the neck of a milk bottle when the device is applied to a bottle. When the disk is at its lowest position, the under surface of the handle adjacent to the pivotal part thereof will rest upon the upper edge of a plate and which tends to limit the movement of the handle in one direction.

In operation, the split ring is adapted to be sprung over the beading about the upper end of the neck of a bottle and be held frictionally thereto by the resiliency of the material of which the ring is made and the disk carried by the handle will be thrown by the spring against the shoulder within the marginal edge of the neck of the bottle and, by reason of the slotted connection between the handle and the disk, the latter will center itself and be held securely in place upon the bottle. When it is desired to remove the closure from the shoulder in the neck of the bottle, the operator by pressing upon the end of the handle may cause the latter to tilt under the tension of the spring as the lever begins to tilt, its end which is pivotally connected to the pin will move a slight distance independent of the disk, after which in a further tilting movement of the lever the disk will be raised from the shoulder in the neck of the bottle.

It will be noted that, by the provision of a device embodying the features of my invention, means is provided whereby the closure may fit bottles having different thicknesses of beadings about the ends of the necks thereto, the closure seating accurately in each instance.

What I claim to be new is:—

1. A closure for milk bottles comprising a split ring designed to engage about the beading of the neck of a bottle, a handle pivotally mounted upon said ring, a disk, a headed pin projecting therefrom, the end of said lever having a slot through which said pin passes, thus allowing the disk to center itself, as set forth.

2. A closure for milk bottles comprising a resilient split ring, a plate fastened thereto and having laterally and horizontally disposed wings, a lever having pintles engaging apertures in said wings, a spring bearing between said plate and handle, and designed to hold a portion of the under surface of the handle against the top of the plate to limit the movement of the handle in one direction, said handle having an angled slotted end, a disk, and a headed pin fastened thereto and passing through said slot, as set forth.

In testimony whereof I hereunto affix my signature in presence of two witnesses.

JOHN S. RAMSEY.

Witnesses:
 A. R. FOWLER,
 A. L. HOUGH.